G. WALSER.
SUBMARINE LISTENING APPARATUS.
APPLICATION FILED APR. 11, 1919.

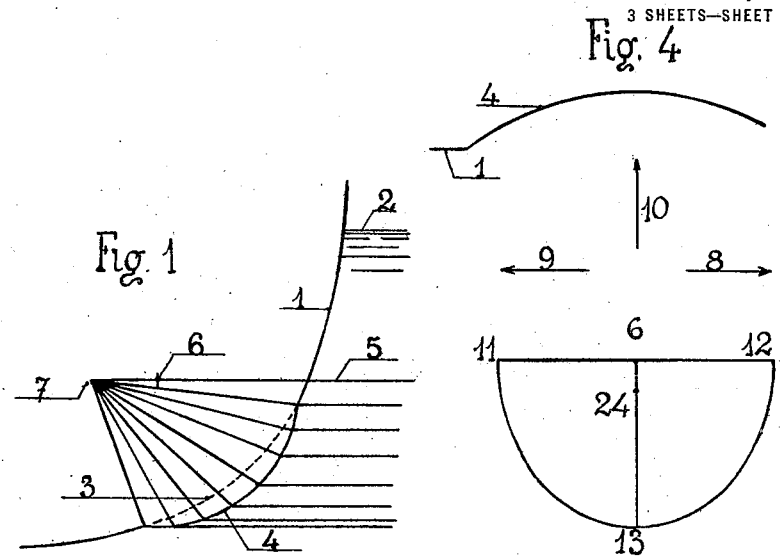
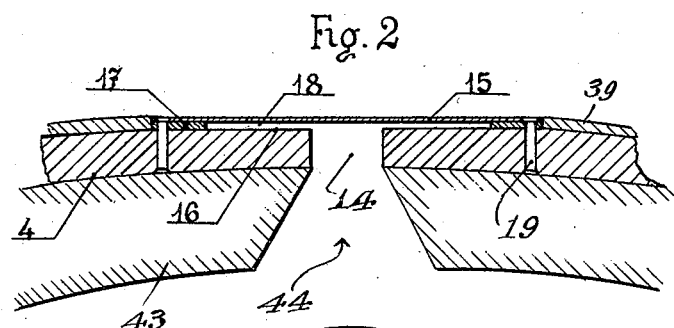
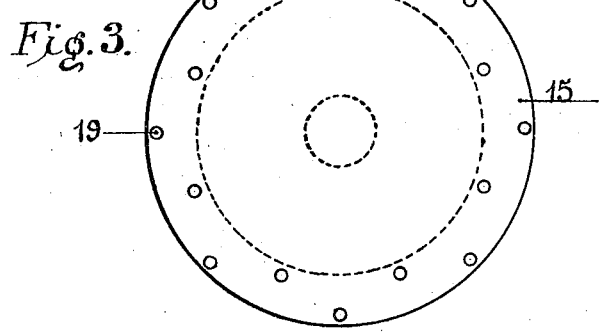

1,391,654.

Patented Sept. 20, 1921.
3 SHEETS—SHEET 2.

Inventor
G. Walser.
By H. R. Kerslake
Atty.

Fig. 6.
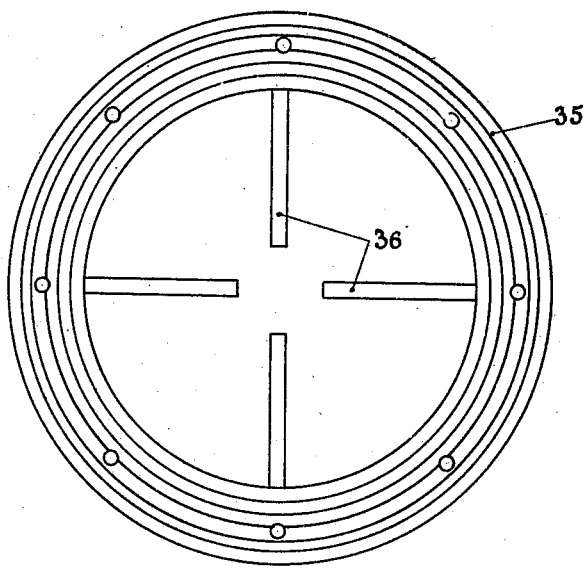
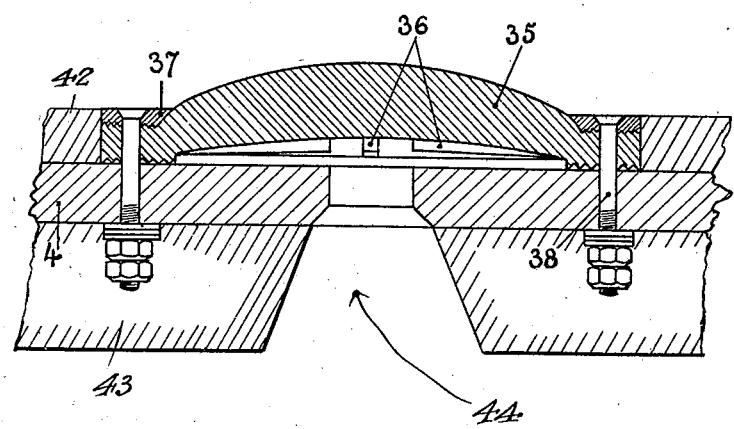
Inventor
G. Walser,
By (signature)
Attorney

UNITED STATES PATENT OFFICE.

GEORGES WALSER, OF PARIS, FRANCE.

SUBMARINE LISTENING APPARATUS.

1,391,654.   Specification of Letters Patent.   Patented Sept. 20, 1921.

Application filed April 11, 1919. Serial No. 289,475.

*To all whom it may concern:*

Be it known that I, GEORGES WALSER, a citizen of the French Republic, and residing at 22 Rue Cambon, Paris, France, have invented certain new and useful Improvements in Submarine Listening Apparatus, for which I have filed an application in France on the 28th of July, 1917, of which the following is a specification.

The present invention relates to a new device for detecting and locating the direction of submarine sounds, the subject thereof being a listening apparatus capable of augmenting the reception of the sound transmitted through the water while diminishing foreign noises and capable of determining the direction from which this sound comes. This device is particularly applicable to the hull of a patrol boat and for searching out submarines the locations of which are revealed by the sound of their screws.

The invention is based on the following principles.

It is known that waves emitted by a sonorous source undergo a refraction at the surface of separation of two media, for example, on passing from the water into the air. If this surface is appropriately selected a point in the air termed a focus corresponds to each sonorous source in the water, at which focus the sonorous waves falling on the surface are concentrated. The position of this focus permits of determining the direction of the sound and, furthermore, when this direction is located, the ear of the observer is but very slightly influenced by foreign sounds not in the corresponding direction, which forms a valuable selective property of this apparatus. It is also possible to localize several sonorous sources separately, which are heard simultaneously in different azimuths.

The device which forms the subject of the present invention is composed of multiple elements which transform aquatic into aerial sounds and which are arranged and grouped in such a manner that when an aquatic sonorous wave affects them, with the relative phase differences which naturally vary with the direction of incidence, there is for each incidence a determined position in which the aerial vibrations sent through all the elements are in phase harmony and hence aid in operating to give a maximum of sound, this position being the focus above defined. The transformer elements may, for example, be formed of stethoscopes having a thin sheet of air.

The transformer elements may be arranged on a spherical sheet metal cap, separating the water from the air, and the convexity of which is directed toward the water. The result is that if a sonorous wave transmitted through the water falls on said surface it is normally refracted in the air into a convergent spherical wave the center of which is a sonorous focus. The noises emitted by each of the sources are never confounded with one another, as a well determined focus corresponding to the direction to each of these sources is provided.

By way of example, an embodiment of this apparatus is described hereinafter and shown on the accompanying drawings, in which:

Figure 1 is a diaphragm of a listening device installed in the hull of a ship.

Figs. 2 and 3 represent, on larger scale, a stethoscope providing a relatively narrow air chamber and attached in front of an opening of the spherical cap:

Fig. 4 shows the position of the sonorous foci given by the device when a distant sonorous source moves in a horizontal plane;

Fig. 6 shows in plan and sectional elevation a different embodiment of the vibrating plate.

Figure 5:
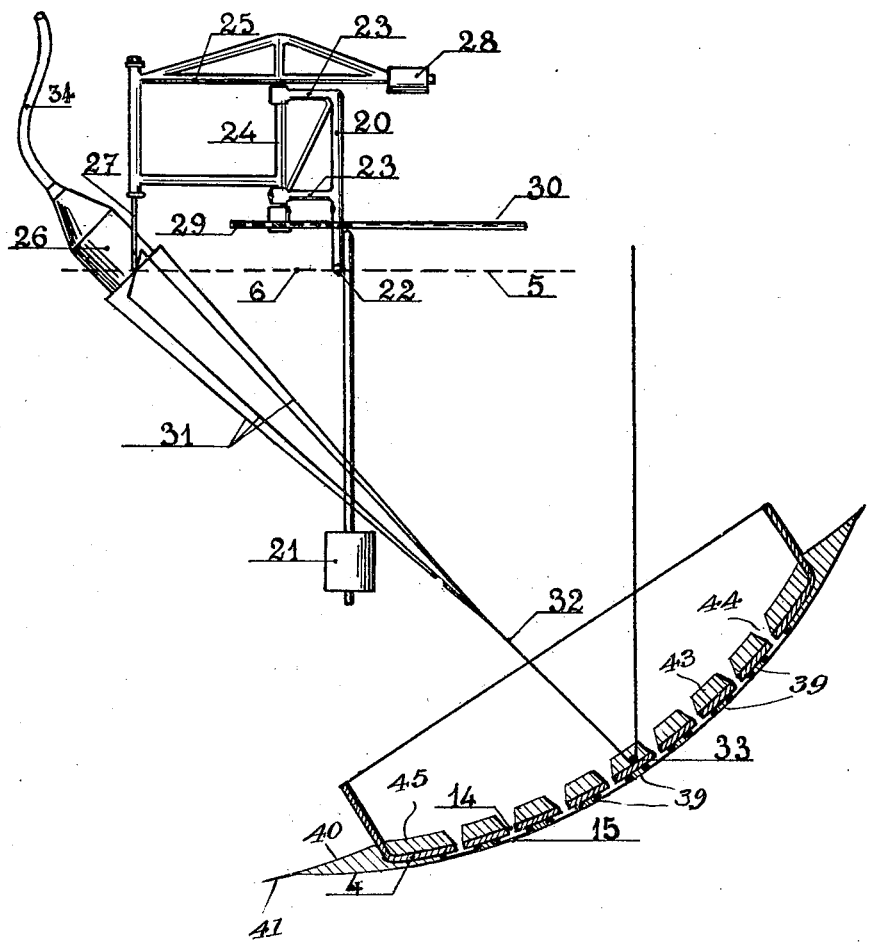
Fig. 5 is a view of the entire listening device with its acoustic horn.

A portion of the surface 3 of the hull of a vessel 1 (Fig. 1) the water line of which is at 2, is cut from said hull and replaced by a spherical cap 4. The sonorous waves coming from a source located in the water, sufficiently distant so that the direction thereof may be considered as horizontal, and falling on this cap, form a focus in the air, the focus being in the horizontal plane 5, sonorous at 7, beyond the center 6 of the sphere 4. This focus remains in the horizontal plane passing through the center 6 no matter what the movements of the vessel, since the direction of the sonorous aquatic waves is assumed to be horizontal. If the sonorous source moves in an azimuth from the front to the rear of the vessel, that is to say (Fig. 4) from the direction 8 to the direction 9 passing through transverse direction 10 the sonorous focus will move from the point 11 to the point 12 passing through the point 13 and describing substantially a semicircle slightly flattened along the diameter 11—12. Each point of this curve is hence the sonorous focus of a single and well defined direction; by moving the opening of an acoustic horn turned toward cap 4 along this curve it is possible to determine the point at which the sound gathered is maximum, that is, the sonorous focus, and to reduce the direction of the source.

The cap 4 is formed of a sheet metal preferably as thick as the part of a hull which it replaces and in addition the outer surface is provided with a plurality of openings 14 in front of which are attached thin metallic diaphragms or membranes 15. Each member 15 is in the form of a flat circular plate and the opposed outer surface of the cap 4 is flat at 16, a flat metallic ring 17 being arranged between each plate 15 and the surface 16 at the time the plate is secured to the cap so as to provide between each plate and the adjacent flattened surface 16 of the cap a layer or cushion of air, as thin as possible but sufficient to permit the necessary vibration of the membrane, as it has been shown by experience that the transmission of sound from the water to the air in a device of this type is much more satisfactory when the stratum of air is thin. Each member 15 is preferably attached by welding and by means of rivets 19. The difference of the pressures of the air and of the water on its two faces deadens it sufficiently from the standpoint of sonorous vibrations so as to accurately register the successive phases of the vibrations of the water and to transmit them to the air without adding their own vibrations thereto. In fact, a diaphragm subject, on one side, to the influence of a permanent pressure is deadened by reason of the fact that it cannot move freely, its own vibrations started as the result of a shock, for example, are very rapidly obliterated and consequently when the diaphragm receives vibrations of determined frequency it produces them without deformation, that is, without adding its own tone. On the outside of cap 4 the spaces 39 left between the different membranes 15 as well as the space 40 between the edges of the cap 4 and the hull of the ship are filled in, so that this cap has a substantially continuous external surface, for the purpose of avoiding the sounds of the water in eddy current, which a non-continuous surface would otherwise produce during travel of the vessel. The metallic membranes may be replaced as shown in Fig. 6 by rubber disks 35 of certain thickness (about 1 c/m) provided on the external surface of the metal cap 4 so that there is a thin sheet of air between them and the sheet metal notwithstanding the pressure of the water on the rubber. These rubber disks are firmly fixed on the cap through a metal ring 37 and bolts 38. They transmit the sonorous vibrations perfectly without occasioning superfluous noises coming from their own vibrations. The spaces 42 between these rubber disks on the external surface are filled with waterproof cement.

Cap 4 serves only for the support of the membranes 15 which only transmit the sound, and all necessary precautions must be taken to prevent the manifestation of shocks which might be communicated to the cap either by the water or by the hull itself. For this purpose the internal surface of the cap may be provided with a thick layer 43 of inert material, leaving open spaces 44 opposite openings 14, and a girdle of cement 45 reinforced with lead provided on the periphery thereof.

Fig. 5 shows the acoustic horn and the manner of its suspension. A frame 20, provided with a counterweight 21 which maintains it in vertical position, is pivoted on an axis 22 parallel to the longitudinal axis of the vessel and positioned in the horizontal plane 5 which contains the center 6 of the spherical cap 4. This frame is provided with two horizontal arms 23, 23, supporting at their ends, in bearings, a vertical axis 24 forming part of a frame 25 which supports the acoustic horn 26, pivoted between two arms of a forked member 27. Said frame 25 is balanced on the vertical axis 24 by means of a counterweight 28. The lower part of the axis 24 terminates in a pulley 29 pivoted in the forked member 27 and is always maintained directed toward the center of the spherical cap 4 by means of a foot 31 extended by a cable 32 which passes over a return pulley 33 attached to the center of the said cap, and held taut by a counterweight not shown. Notwithstanding the rolling movement of the vessel the opening of the horn 26 is always in the horizontal plane of the axis 22, that is to say, substantially in the horizontal plane of the center 6 of the sphere of which the cap forms part, and which contains all the foci corresponding to the horizontal directions of the sonorous waves. If axis 24 is rotated by means of a lever actuating the cable 30 the acoustic horn will describe a semicircle which by reason of the position of the axis 24 with respect to the center 6 (Fig. 4) blends substantially with the geometric position of the sonorous foci corresponding to the horizontal directions. The horn 26 will be a simple cone or, better, it may be formed by the juxtaposition of small cones having parallel axes. It is extended to the ear of the observer by means of a flexible acoustic tube 34.

The installation of the listening apparatus on board a vessel comprises one device on each side. The whole is inclosed in a well insulated acoustic compartment. The observer is at the center of the compartment so as to be able to listen at will in either of the two devices. If he perceives a sound in the device of one side he pays attention only to this device and tries to put his horn in a position which gives the maximum intensity of sound; the corresponding position of the control lever of the cable 30 then indicates on a scale the direction from which the sound comes.

I claim:—

1. A device for transmitting, uniformly refracting and concentrating into a focus sonorous waves from the water into the air comprising, a plurality of small identical diaphragms for transmitting the sonorous vibrations, arranged in contact at one side with the water and at the other side with the air, and also arranged adjacent to, but insulated from each other, and located tangentially to a geometric surface having a focus of refraction distinct for each direction of propagation of the waves received, an acoustic receiver moving upon the spot of the foci of the said surface; and a support for said diaphragm.

2. A submarine listening device for a vessel comprising an externally convexed spherical cap, adapted for closing an opening in the hull of the vessel, the external face of the cap being provided with a plurality of relatively flat facets each of which is formed with a central opening, a diaphragm closure member on each facet for transmitting the sonorous vibrations and spaced from the facet to provide a layer of air therebetween, a thick layer of inert material on the cap except opposite the openings and an acoustic horn movable about a vertical axis and a horizontal axis adjacent the center of the sphere of which the spherical cap forms a part and always directed toward the center of the cap.

3. A submarine listening apparatus composed of a spherical sheet metal cap the convexity of which is directed toward the water, a thick layer of inert material covering the inner surface of the cap, the outer spherical face of the cap comprising a plurality of plane facets each having an opening at the center thereof, a diaphragm arranged exteriorly of the cap for covering each opening so as to be capable of transmitting sonorous vibrations and being slightly spaced from the adjacent face of the cap to provide a thin layer of air therebetween in such a manner as to obtain in the air within the vessel, a focus from which the sound emitted from a sonorous source is located in a certain azimuth is strengthened while the sound emitted from the sonorous sources not in the same azimuth are obliterated or attenuated, the vibration of the membranes operating to effect an increase of sound at the focus, the position of which determines the direction of the sonorous source.

4. A submarine listening apparatus composed of a spherical sheet metal cap the convexity of which is directed toward the water, a thick layer of inert material on the inner surface of the cap; said spherical cap having its outer surface formed into a plurality of flat facets; each having a central opening, a diaphragm for externally closing each opening and capable of transmitting sonorous vibrations, with the interposition of a thin layer of air between the sheet metal and the diaphragm, said spherical cap being mounted on the hull of the vessel corresponding part of which has been removed, so as to obtain in the air, at the interior of the vessel, a focus in which the sound emitted from a source located in a certain azimuth is increased while the sound emitted from sonorous sources not in the same azimuth are obliterated or attenuated, the vibrations of the membranes operating to strengthen the sound at the focus, the position of this latter determining the direction of the sonorous source.

In testimony whereof I have signed my name to this specification.

GEORGES WALSER.